(12) United States Patent
Baker et al.

(10) Patent No.: US 12,287,096 B2
(45) Date of Patent: Apr. 29, 2025

(54) BBQ OVEN

(71) Applicant: GMG Products, LLC, Lakeside, OR (US)

(72) Inventors: David W. Baker, Lakeside, OR (US); Jason E. Baker, Scottsdale, AZ (US); Wang Ping, Wuhan (CN)

(73) Assignee: GMG Products, LLC, Lakeside, OR (US)

( * ) Notice: Subject to any disclaimer, the term of this patent is extended or adjusted under 35 U.S.C. 154(b) by 318 days.

(21) Appl. No.: 17/765,437

(22) PCT Filed: Mar. 3, 2022

(86) PCT No.: PCT/CN2022/078958
§ 371 (c)(1),
(2) Date: Mar. 30, 2022

(87) PCT Pub. No.: WO2023/164859
PCT Pub. Date: Sep. 7, 2023

(65) Prior Publication Data
US 2023/0288070 A1  Sep. 14, 2023

(51) Int. Cl.
*F24B 1/02* (2006.01)
*A47J 36/32* (2006.01)
(Continued)

(52) U.S. Cl.
CPC ............... *F24B 1/028* (2013.01); *A47J 36/32* (2013.01); *A47J 37/0704* (2013.01);
(Continued)

(58) Field of Classification Search
CPC ........ A47J 2202/00; A47J 36/32; A47J 37/04; A47J 37/06; A47J 37/07; A47J 37/0704;
(Continued)

(56) References Cited

U.S. PATENT DOCUMENTS 100,410 A    3/1870  Hull
103,736 A    5/1870  Gregory
(Continued)

FOREIGN PATENT DOCUMENTS

AT       411098      9/2003
CN    102300492     12/2011
(Continued)

OTHER PUBLICATIONS

International Preliminary Report on Patentability dated May 17, 2022, in International Patent Application No. PCT/US2020/062211, 9 pages.

(Continued)

*Primary Examiner* — Jorge A Pereiro
*Assistant Examiner* — Logan P Jones
(74) *Attorney, Agent, or Firm* — Lowe Graham Jones PLLC (57) ABSTRACT

The present application relates to a BBQ oven, comprising an oven, a loading container and a mixing unit. The loading container is arranged on the oven, having a loading inlet on the top and a discharge outlet at the bottom; the mixing unit includes a mixing driver positioned on the side wall of the loading container and a mixer connected to the mixing driver. The BBQ oven requires no manual turning to prevent fuel arching as the mixing unit consisting of the mixing driver and the mixer connected to the mixing driver can mix and split fuel being arched by turning of the mixer driven by the mixing driver, and thereby reduces the labor work intensity.

14 Claims, 7 Drawing Sheets

(51) Int. Cl.
  *A47J 37/06* (2006.01)
  *A47J 37/07* (2006.01)
  *F24B 5/06* (2006.01)
  *F24B 13/04* (2006.01)
  *A47J 37/04* (2006.01)

(52) U.S. Cl.
  CPC .............. *A47J 37/0786* (2013.01); *F24B 5/06* (2013.01); *F24B 13/04* (2013.01); *A47J 2202/00* (2013.01)

(58) Field of Classification Search
  CPC ....... A47J 37/0786; F24B 1/024; F24B 1/028; F24B 13/04; F24B 5/06
  See application file for complete search history.

(56) References Cited

U.S. PATENT DOCUMENTS

| | | | |
|---|---|---|---|
| 119,169 | A | 9/1871 | Ogden |
| 161,577 | A | 3/1875 | Thomas |
| 382,886 | A * | 5/1888 | Lee ................. B65D 88/68 222/231 |
| 1,038,420 | A | 9/1912 | Newcomer et al. |
| 1,433,062 | A | 10/1922 | Bellamy |
| RE16,011 | E | 3/1925 | Simon |
| 1,650,634 | A | 11/1927 | Lutzler |
| 1,755,674 | A * | 4/1930 | Tauriainen ............. B65D 88/68 222/271 |
| 1,919,407 | A | 7/1933 | Wood |
| 1,938,565 | A | 12/1933 | Anderson |
| 1,960,778 | A * | 5/1934 | Goss ................. B65D 88/68 110/286 |
| 2,068,018 | A * | 1/1937 | Goetz ................. F23K 3/14 110/286 |
| 2,354,240 | A | 7/1944 | Young et al. |
| 2,365,679 | A | 12/1944 | Casey |
| 2,620,970 | A * | 12/1952 | Palmer ................. F04D 29/329 416/93 R |
| 2,641,085 | A | 6/1953 | Robinson et al. |
| 2,833,363 | A * | 5/1958 | Henehan ............. H01M 50/202 180/68.5 |
| 2,997,566 | A | 8/1961 | Pierce et al. |
| 3,021,386 | A | 2/1962 | Clark |
| 3,073,263 | A | 1/1963 | Wynkoop |
| 3,307,506 | A | 3/1967 | Rose |
| 3,327,698 | A | 6/1967 | Leslie |
| 3,384,066 | A | 5/1968 | Tufts |
| 3,413,935 | A | 12/1968 | Behrns |
| 3,453,975 | A | 7/1969 | Gunter |
| 3,474,725 | A | 10/1969 | McClaren |
| 3,586,518 | A | 6/1971 | Folmar |
| 3,609,236 | A | 9/1971 | Heilman |
| 3,739,732 | A | 6/1973 | Graham |
| 3,742,839 | A * | 7/1973 | Maley ................. A47J 37/0745 126/25 R |
| 3,745,303 | A | 7/1973 | Epperson et al. |
| 3,765,397 | A | 10/1973 | Henderson |
| 3,814,005 | A | 6/1974 | Widdel |
| 3,838,249 | A | 9/1974 | Detterbeck |
| 3,903,866 | A | 9/1975 | Polinski |
| 3,934,520 | A | 1/1976 | Brennan et al. |
| 4,020,322 | A | 4/1977 | Muse |
| 4,094,295 | A | 6/1978 | Boswell et al. |
| 4,094,649 | A | 6/1978 | Osterried |
| 4,227,510 | A | 10/1980 | Frazier et al. |
| 4,241,650 | A | 12/1980 | John et al. |
| 4,334,462 | A | 6/1982 | Hefling |
| 4,374,489 | A | 2/1983 | Robbins |
| 4,395,958 | A | 8/1983 | Caffyn et al. |
| 4,401,017 | A | 8/1983 | Feld |
| D270,987 | S | 10/1983 | Scheufler |
| 4,413,609 | A | 11/1983 | Tisdale |
| 4,417,565 | A | 11/1983 | Karpinia |
| 4,454,805 | A | 6/1984 | Matthews |
| 4,481,408 | A | 11/1984 | Scheufler |
| 4,491,722 | A | 1/1985 | Fischer et al. |
| 4,495,860 | A | 1/1985 | Hitch et al. |
| 4,503,835 | A | 3/1985 | Williams |
| 4,508,094 | A | 4/1985 | Hait |
| 4,509,412 | A | 4/1985 | Whittenburg et al. |
| 4,510,916 | A | 4/1985 | Ogden |
| 4,512,249 | A | 4/1985 | Mentzel |
| 4,531,505 | A | 7/1985 | Hait et al. |
| 4,531,507 | A | 7/1985 | Gerson |
| 4,539,973 | A | 9/1985 | Hait |
| 4,554,864 | A | 11/1985 | Smith et al. |
| 4,574,776 | A | 3/1986 | Hidle |
| 4,587,947 | A | 5/1986 | Tomita |
| 4,591,698 | A | 5/1986 | Chang |
| 4,603,679 | A | 8/1986 | Ogden |
| 4,624,238 | A | 11/1986 | Hait |
| 4,626,352 | A | 12/1986 | Massey et al. |
| 4,628,351 | A | 12/1986 | Heo |
| 4,638,787 | A | 1/1987 | Tyson |
| 4,706,643 | A | 11/1987 | Tyson |
| 4,711,979 | A | 12/1987 | Glasser et al. |
| 4,714,013 | A | 12/1987 | Telfer |
| 4,721,037 | A | 1/1988 | Blosnich |
| 4,762,056 | A | 8/1988 | Virag |
| 4,788,905 | A | 12/1988 | Von Kohorn |
| 4,803,921 | A | 2/1989 | Nuss |
| 4,867,050 | A | 9/1989 | Patenaude et al. |
| 4,877,010 | A | 10/1989 | Hait |
| 4,909,235 | A | 3/1990 | Boetcker |
| 4,909,237 | A | 3/1990 | Karpinia |
| 4,910,372 | A | 3/1990 | Vukich |
| 4,938,202 | A | 7/1990 | Hait |
| 4,958,578 | A | 9/1990 | Houser |
| 4,962,696 | A | 10/1990 | Gillis |
| 4,976,252 | A | 12/1990 | Cianciola |
| 4,987,827 | A | 1/1991 | Marquez |
| 5,070,777 | A | 12/1991 | Novak |
| 5,086,752 | A | 2/1992 | Hait |
| 5,094,223 | A | 3/1992 | Gonzalez |
| 5,094,280 | A | 3/1992 | Kahilahti et al. |
| 5,097,817 | A | 3/1992 | Dodgen |
| 5,123,360 | A | 6/1992 | Burke et al. |
| 5,154,159 | A | 10/1992 | Knafelc et al. |
| 5,167,183 | A | 12/1992 | Schlosser et al. |
| 5,168,796 | A | 12/1992 | Porton et al. |
| 5,172,682 | A | 12/1992 | Luebke et al. |
| 5,176,067 | A | 1/1993 | Higgins |
| 5,176,124 | A | 1/1993 | Wrasse |
| 5,185,047 | A | 2/1993 | Ray |
| D333,941 | S | 3/1993 | Hait |
| 5,195,423 | A | 3/1993 | Beller |
| 5,197,379 | A | 3/1993 | Leonard, Jr. |
| 5,197,455 | A | 3/1993 | Tessien |
| 5,218,950 | A | 6/1993 | Hait |
| 5,253,634 | A | 10/1993 | LeBeouf |
| 5,269,286 | A | 12/1993 | Cowan |
| 5,276,307 | A | 1/1994 | Higgins |
| 5,287,799 | A | 2/1994 | Pickering et al. |
| 5,313,877 | A | 5/1994 | Holland |
| D347,548 | S | 6/1994 | Boehm et al. |
| 5,359,988 | A | 11/1994 | Hait |
| 5,425,352 | A | 6/1995 | Gillam et al. |
| 5,437,222 | A | 8/1995 | Franklin |
| 5,469,835 | A | 11/1995 | Stephen et al. |
| 5,473,980 | A | 12/1995 | Carpenter |
| 5,495,845 | A | 3/1996 | Hait |
| 5,516,009 | A * | 5/1996 | Kautz ................. B65D 88/68 366/329.1 |
| 5,517,902 | A | 5/1996 | Boston |
| 5,524,610 | A | 6/1996 | Clark |
| 5,528,984 | A | 6/1996 | Saurwein |
| D376,510 | S | 12/1996 | Ting |
| 5,586,488 | A | 12/1996 | Liu |
| 5,605,092 | A | 2/1997 | Riccio |
| 5,617,778 | A | 4/1997 | Schroeter et al. |
| D379,900 | S | 6/1997 | Gillam et al. |
| 5,649,477 | A | 7/1997 | Lingwood |
| 5,655,435 | A | 8/1997 | Rachesky |

(56) References Cited

U.S. PATENT DOCUMENTS

| | | |
|---|---|---|
| 5,687,704 A | 11/1997 | Lerch et al. |
| 5,775,315 A | 7/1998 | Baykal |
| 5,797,386 A | 8/1998 | Orr |
| 5,809,871 A | 9/1998 | Arathoon |
| 5,809,991 A | 9/1998 | Pai |
| 5,821,507 A | 10/1998 | Sasaki et al. |
| 5,884,006 A | 3/1999 | Frohlich et al. |
| 5,891,498 A | 4/1999 | Boehler |
| D411,407 S | 6/1999 | Anthony |
| 5,957,038 A | 9/1999 | Shimazaki |
| 6,035,770 A | 3/2000 | Whitefield |
| 6,055,901 A | 5/2000 | Gantos et al. |
| 6,058,832 A | 5/2000 | Fountain |
| 6,065,464 A | 5/2000 | Zajec |
| 6,065,466 A | 5/2000 | Baykal |
| 6,076,515 A | 6/2000 | Smith |
| 6,097,004 A | 8/2000 | Seul |
| 6,103,291 A | 8/2000 | Fernandez Tapia |
| 6,108,489 A | 8/2000 | Frohlich et al. |
| 6,125,740 A | 10/2000 | Hedrington et al. |
| 6,161,534 A | 12/2000 | Kronman |
| 6,167,799 B1 | 1/2001 | Macias |
| 6,176,173 B1 | 1/2001 | Holbrook et al. |
| 6,187,359 B1 | 2/2001 | Zuccarini |
| D439,792 S | 4/2001 | Hedrington et al. |
| 6,213,006 B1 | 4/2001 | Reardon et al. |
| 6,223,737 B1 | 5/2001 | Buckner |
| 6,229,563 B1 | 5/2001 | Miller, II et al. |
| 6,263,786 B1 | 7/2001 | Raio et al. |
| 6,289,795 B1 | 9/2001 | McLemore et al. |
| 6,307,193 B1 | 10/2001 | Toole |
| 6,314,868 B1 | 11/2001 | Christensen et al. |
| 6,314,869 B1 | 11/2001 | Bourgeois, Jr. |
| 6,425,388 B1 | 7/2002 | Korinchock |
| 6,467,400 B2 | 10/2002 | Raio et al. |
| 6,523,463 B1 | 2/2003 | Hogle |
| 6,525,299 B2 | 2/2003 | Hannon et al. |
| 6,546,849 B1 | 4/2003 | Shimazaki |
| 6,568,314 B1 | 5/2003 | Stepanova |
| 6,640,695 B2 | 11/2003 | Stark |
| 6,675,794 B1 | 1/2004 | Yang |
| 6,688,301 B1 | 2/2004 | McNeill |
| 6,874,495 B2 | 4/2005 | McFadden |
| 6,874,496 B2 | 4/2005 | Waits et al. |
| 7,021,202 B2 | 4/2006 | Sizer |
| 7,101,583 B1 | 9/2006 | Bove |
| 7,107,983 B1 | 9/2006 | West |
| 7,312,424 B2 | 12/2007 | Hannon et al. |
| 7,337,712 B1 | 3/2008 | Wang et al. |
| 7,449,665 B2 | 11/2008 | Fadelli et al. |
| 7,467,718 B1 | 12/2008 | Donohue |
| 7,575,002 B2 | 8/2009 | DeMars et al. |
| 7,681,493 B2 | 3/2010 | Moore |
| 7,685,931 B2 | 3/2010 | Rivera |
| 7,686,010 B2 | 3/2010 | Gustavsen |
| D623,013 S | 9/2010 | Alden et al. |
| D624,781 S | 10/2010 | Allen et al. |
| 7,832,330 B1 | 11/2010 | Thompson |
| 7,900,553 B1 * | 3/2011 | Maurin ............... F23B 50/12 126/41 R |
| 7,900,624 B2 | 3/2011 | DeMars et al. |
| D640,896 S | 7/2011 | Molayem |
| D642,421 S | 8/2011 | Difante |
| 8,067,716 B1 | 11/2011 | Lloyd |
| D653,074 S | 1/2012 | Difante |
| D658,424 S | 5/2012 | Difante |
| D658,425 S | 5/2012 | Difante |
| 8,181,640 B2 | 5/2012 | Park |
| 8,291,896 B1 | 10/2012 | Gonnella et al. |
| 8,365,717 B1 | 2/2013 | Perry |
| D687,257 S | 8/2013 | DiFante |
| 8,578,927 B2 | 11/2013 | Gustavsen |
| 8,651,018 B1 | 2/2014 | Loud, III |
| 8,662,069 B2 | 3/2014 | Gasparini et al. |
| 8,662,070 B2 | 3/2014 | Johnston |
| 8,720,322 B2 | 5/2014 | West |
| D707,075 S | 6/2014 | Fung |
| 8,752,479 B2 | 6/2014 | Sacherman et al. |
| 8,763,519 B2 | 7/2014 | Ricchio et al. |
| 8,826,806 B2 | 9/2014 | Difante |
| 9,003,962 B2 | 4/2015 | Broerman |
| D733,483 S | 7/2015 | Baker et al. |
| 9,182,129 B2 | 11/2015 | Dahle et al. |
| 9,226,343 B2 | 12/2015 | Moon et al. |
| D748,424 S | 2/2016 | Funnell, II et al. |
| 9,504,352 B2 | 11/2016 | Lin |
| D782,864 S | 4/2017 | Bhogal et al. |
| D784,730 S | 4/2017 | Kruger |
| D784,759 S | 4/2017 | Nadal |
| D786,014 S | 5/2017 | Knight |
| 9,635,979 B2 | 5/2017 | Abrams et al. |
| 9,644,847 B2 | 5/2017 | Bhogal et al. |
| 9,668,615 B2 | 6/2017 | Contarino, Jr. |
| 9,702,563 B2 | 7/2017 | Probst et al. |
| 9,718,220 B1 | 8/2017 | Claridge Huggins |
| D802,996 S | 11/2017 | Bhogal et al. |
| 9,848,731 B2 | 12/2017 | Dahle et al. |
| 9,879,435 B2 | 1/2018 | Kruger et al. |
| D812,973 S | 3/2018 | Nadal |
| 9,927,129 B2 | 3/2018 | Bhogal et al. |
| 9,970,661 B2 | 5/2018 | Calvin |
| 10,021,889 B2 | 7/2018 | Vinett |
| 10,024,544 B2 | 7/2018 | Bhogal et al. |
| 10,058,172 B2 | 8/2018 | Staib |
| D828,713 S | 9/2018 | Correa |
| D844,961 S | 4/2019 | Toms, Jr. et al. |
| 10,292,531 B1 * | 5/2019 | Hancock ............... A23B 4/0523 |
| D861,409 S | 10/2019 | Bhogal et al. |
| 10,523,851 B2 | 12/2019 | Armstrong |
| 10,674,569 B2 | 6/2020 | Luckhardt et al. |
| 10,778,876 B2 | 9/2020 | Goettlein |
| D901,244 S | 11/2020 | Baker et al. |
| D921,413 S | 6/2021 | Fitzpatrick |
| 11,166,590 B2 | 11/2021 | Zheng |
| 2002/0017290 A1 | 2/2002 | Hines, Jr. |
| 2002/0069764 A1 | 6/2002 | Cohen |
| 2002/0166460 A1 | 11/2002 | O'Shea |
| 2003/0001721 A1 | 1/2003 | Daum et al. |
| 2003/0096159 A1 * | 5/2003 | Suzuki ............... H01M 50/213 429/96 |
| 2004/0020482 A1 | 2/2004 | Chen |
| 2004/0025862 A1 | 2/2004 | Lor et al. |
| 2004/0094142 A1 | 5/2004 | Christensen et al. |
| 2004/0154611 A1 | 8/2004 | Beech |
| 2004/0226454 A1 | 11/2004 | Pirkle et al. |
| 2004/0255926 A1 | 12/2004 | Waits et al. |
| 2005/0098168 A1 | 5/2005 | Williams et al. |
| 2005/0205076 A1 | 9/2005 | Boucher |
| 2006/0042475 A1 | 3/2006 | Craig |
| 2006/0102167 A1 | 5/2006 | Driscoll, Jr. |
| 2006/0124120 A1 | 6/2006 | Gross |
| 2006/0225580 A1 | 10/2006 | Fernandez et al. |
| 2006/0236995 A1 | 10/2006 | Chang |
| 2006/0260603 A1 | 11/2006 | Shah |
| 2007/0006863 A1 | 1/2007 | Barbarich |
| 2007/0108177 A1 | 5/2007 | Engelhardt |
| 2007/0169636 A1 | 7/2007 | Carlson et al. |
| 2007/0221191 A1 | 9/2007 | O'Brien et al. |
| 2007/0246453 A1 | 10/2007 | Nam et al. |
| 2007/0277800 A1 | 12/2007 | Chiang |
| 2008/0000467 A1 | 1/2008 | Dudley et al. |
| 2008/0047540 A1 | 2/2008 | Hoffman et al. |
| 2008/0085172 A1 | 4/2008 | Harman et al. |
| 2008/0196708 A1 | 8/2008 | Lee |
| 2008/0230043 A1 | 9/2008 | Bruno |
| 2008/0247313 A1 | 10/2008 | Nath et al. |
| 2009/0004348 A1 | 1/2009 | Silva |
| 2009/0064985 A1 | 3/2009 | Gustavsen |
| 2009/0078246 A1 | 3/2009 | Leavens et al. |
| 2009/0165772 A1 | 7/2009 | Hunt et al. |
| 2009/0173238 A1 | 7/2009 | Martinez et al. |
| 2009/0229476 A1 | 9/2009 | Bedard |
| 2009/0293860 A1 | 12/2009 | Carlson |
| 2009/0301463 A1 | 12/2009 | Park |

(56) References Cited

U.S. PATENT DOCUMENTS

| | | |
|---|---|---|
| 2010/0051600 A1 | 3/2010 | Maier |
| 2010/0084355 A1 | 4/2010 | Parks et al. |
| 2010/0124596 A1 | 5/2010 | Nelson |
| 2010/0147281 A1 | 6/2010 | Gustavsen |
| 2010/0218754 A1 | 9/2010 | Kuntz |
| 2010/0258104 A1 | 10/2010 | DeFoort et al. |
| 2011/0048399 A1 | 3/2011 | Hong |
| 2011/0123689 A1 | 5/2011 | Luckhardt et al. |
| 2011/0132347 A1 | 6/2011 | Kim |
| 2011/0197872 A1 | 8/2011 | Thiry |
| 2011/0214662 A1 | 9/2011 | Contarino, Jr. |
| 2011/0219957 A1 | 9/2011 | Fogolin |
| 2011/0219958 A1 | 9/2011 | Noble |
| 2011/0265663 A1 | 11/2011 | Li |
| 2012/0017884 A1 | 1/2012 | Van Den Hoff et al. |
| 2012/0060819 A1 | 3/2012 | Hunt et al. |
| 2012/0076351 A1 | 3/2012 | Yoon et al. |
| 2012/0107476 A1 | 5/2012 | McLemore et al. |
| 2012/0174798 A1 | 7/2012 | Kulikowski |
| 2012/0225178 A1 | 9/2012 | Degnan |
| 2012/0240790 A1 | 9/2012 | Difante |
| 2012/0258229 A1 | 10/2012 | Mindrup |
| 2012/0260903 A1 | 10/2012 | Buerkle |
| 2012/0269028 A1* | 10/2012 | Gordon ............... A01K 5/0258 366/156.2 |
| 2013/0074702 A1 | 3/2013 | Difante |
| 2013/0081609 A1 | 4/2013 | Dhuper et al. |
| 2013/0112186 A1 | 5/2013 | Crichlow |
| 2013/0125765 A1 | 5/2013 | Difante |
| 2013/0276643 A1 | 10/2013 | Krolick et al. |
| 2013/0319258 A1 | 12/2013 | Cleveland et al. |
| 2014/0026762 A1 | 1/2014 | Riefenstein |
| 2014/0026881 A1 | 1/2014 | Abrams et al. |
| 2014/0048055 A1 | 2/2014 | Ruther |
| 2014/0130788 A1 | 5/2014 | Contarino, Jr. |
| 2014/0144333 A1 | 5/2014 | Ahmed |
| 2014/0165851 A1 | 6/2014 | Shingler |
| 2014/0196609 A1 | 7/2014 | Snyman |
| 2014/0251160 A1 | 9/2014 | Contarino, Jr. |
| 2014/0287119 A1 | 9/2014 | Dahle et al. |
| 2014/0299005 A1 | 10/2014 | Vinett |
| 2015/0027432 A1 | 1/2015 | Contarino, Jr. |
| 2015/0034065 A1 | 2/2015 | McQuillan |
| 2015/0068512 A1 | 3/2015 | Mehler et al. |
| 2015/0079250 A1 | 3/2015 | Ahmed |
| 2015/0114238 A1 | 4/2015 | Palermo |
| 2015/0124849 A1 | 5/2015 | Parthasarathy |
| 2015/0164278 A1 | 6/2015 | Kohler et al. |
| 2015/0201805 A1 | 7/2015 | Cedar et al. |
| 2015/0208669 A1 | 7/2015 | Klock et al. |
| 2015/0233585 A1 | 8/2015 | Creel |
| 2015/0253364 A1 | 9/2015 | Hieda et al. |
| 2015/0285512 A1 | 10/2015 | Matarazzi et al. |
| 2015/0285513 A1 | 10/2015 | Matarazzi et al. |
| 2015/0289719 A1 | 10/2015 | Contarino, Jr. |
| 2015/0297029 A1 | 10/2015 | Smith et al. |
| 2015/0305560 A1 | 10/2015 | Hamlin |
| 2015/0320259 A1* | 11/2015 | Tucker ............... F24B 13/04 126/10 |
| 2015/0338104 A1 | 11/2015 | Lipinski |
| 2015/0371513 A1 | 12/2015 | Stokes |
| 2016/0102868 A1 | 4/2016 | Johnson et al. |
| 2016/0102869 A1 | 4/2016 | Johnson et al. |
| 2016/0174766 A1 | 6/2016 | Schlosser et al. |
| 2016/0183723 A1 | 6/2016 | Nadal |
| 2016/0183724 A1 | 6/2016 | Nadal |
| 2016/0227965 A1 | 8/2016 | Johnston et al. |
| 2016/0302606 A1 | 10/2016 | Kallos |
| 2016/0334112 A1 | 11/2016 | Wiseman et al. |
| 2016/0366314 A1 | 12/2016 | Pfaffinger, Jr. et al. |
| 2017/0020148 A1 | 1/2017 | Dixon et al. |
| 2017/0020337 A1 | 1/2017 | Borovicka et al. |
| 2017/0055535 A1 | 3/2017 | Froelicher et al. |
| 2017/0065124 A1 | 3/2017 | Colston |
| 2017/0074522 A1 | 3/2017 | Cheng |
| 2017/0102149 A1 | 4/2017 | Nadal |
| 2017/0115008 A1 | 4/2017 | Erbe et al. |
| 2017/0195542 A1 | 7/2017 | Thomas et al. |
| 2017/0257226 A1 | 9/2017 | Bi |
| 2017/0261213 A1 | 9/2017 | Park et al. |
| 2017/0303348 A1 | 10/2017 | Kondo et al. |
| 2017/0332841 A1 | 11/2017 | Reischmann |
| 2018/0058702 A1 | 3/2018 | Jang et al. |
| 2018/0157232 A1 | 6/2018 | Chen |
| 2018/0187898 A1 | 7/2018 | Matarazzi et al. |
| 2018/0296031 A1 | 10/2018 | Terrell, Jr. et al. |
| 2018/0324908 A1 | 11/2018 | Denker et al. |
| 2018/0325314 A1* | 11/2018 | Walters ............... A47J 37/0713 |
| 2018/0347821 A1 | 12/2018 | Wild |
| 2018/0368618 A1* | 12/2018 | Measom ............. A47J 37/0704 |
| 2018/0372326 A1 | 12/2018 | Park et al. |
| 2019/0132396 A1 | 5/2019 | Finnegan et al. |
| 2019/0134580 A1 | 5/2019 | Ghazarian |
| 2019/0274476 A1 | 9/2019 | Dahle et al. |
| 2019/0277509 A1 | 9/2019 | Hildner et al. |
| 2019/0285283 A1 | 9/2019 | Ebrom et al. |
| 2019/0298107 A1 | 10/2019 | Baker et al. |
| 2020/0041134 A1 | 2/2020 | Luckhardt et al. |
| 2020/0069111 A1 | 3/2020 | Eiter et al. |
| 2020/0154943 A1 | 5/2020 | Baker |
| 2020/0154944 A1 | 5/2020 | Baker |
| 2020/0214503 A1* | 7/2020 | Altenritter ............. F24B 13/04 |
| 2020/0236743 A1 | 7/2020 | Yang et al. |
| 2020/0281402 A1 | 9/2020 | Witzel et al. |
| 2021/0052107 A1* | 2/2021 | Pruitt ...................... A47J 36/32 |
| 2021/0071871 A1 | 3/2021 | Stork-Wersborg |
| 2021/0113016 A1 | 4/2021 | Dean |
| 2021/0152578 A1 | 5/2021 | Alanazi |
| 2021/0222887 A1 | 7/2021 | Moore et al. |
| 2021/0356130 A1 | 11/2021 | Li |
| 2021/0401223 A1 | 12/2021 | Han et al. |
| 2022/0373173 A1* | 11/2022 | Chlebovec ......... B65G 65/4881 |
| 2023/0083403 A1 | 3/2023 | Jun et al. |

FOREIGN PATENT DOCUMENTS

| | | |
|---|---|---|
| CN | 206669789 U | 11/2017 |
| CN | 107616719 | 1/2018 |
| CN | 208967878 U | 6/2019 |
| CN | 211657980 U | 10/2020 |
| CN | 112263156 | 1/2021 |
| CN | 112716318 | 4/2021 |
| CN | 213189188 | 5/2021 |
| CN | 113558489 | 10/2021 |
| CN | 114089639 | 2/2022 |
| DE | 102008042804 | 4/2009 |
| DE | 202013000669 U1 | 6/2013 |
| FR | 2597319 A1 * | 10/1987 |
| JP | 2008286466 | 11/2008 |
| KR | 20160069359 | 6/2016 |
| WO | 2022/204182 | 9/2022 |

OTHER PUBLICATIONS

International Search Report and Written Opinion of the International Searching Authority completed Jan. 22, 2021, in International Patent Application No. PCT/US2020/062211, 10 pages.

International Search Report and Written Opinion of the International Searching Authority completed Feb. 15, 2024, in International Patent Application No. PCT/US2023/080610, 19 pages.

International Search Report and Written Opinion of the International Searching Authority completed Oct. 20, 2022 (+ English translation), in International Patent Application No. PCT/CN2022/078958, 15 pages.

Casement Window: Site Visited Oct. 30, 2024, available from URL: https://www.archiexpo.com/prod/andersen/product-8990-1349389. html, 3 pages.

Drip EZ Pellet Grip Hopper Shelf, announced online Jun. 23, 2023, site visited Oct. 30, 2024, at https://www.bbqguys.com/drip-ez/pellet-grill-hopper-shelf-hs-1, 7 pages.

GMG Hopper Assembly for Ledge, site visited Oct. 30, 2024, available from URL: https://grillcollection.com/products/gmg-hopper- (56) References Cited

OTHER PUBLICATIONS assembly-for-ledge-daniel -boone-and-peak-jim-bowie-12v-only-stainless-steel-lid-with-window, 6 pages.
International Search Report and Written Opinion of the International Searching Authority mailed Nov. 27, 2024, in International Patent Application No. PCT/US2024/044927, 13 pages.

* cited by examiner

BBQ OVEN

PRIORITY CLAIM

This application is a U.S. National Phase of International Patent Application No. PCT/CN2022/078958 filed Mar. 3, 2022, the contents of which is incorporated herein by reference.

FIELD OF THE INVENTION

The present invention relates to the BBQ field, in particular to a BBQ oven.

BACKGROUND OF THE INVENTION

Existing BBQ ovens require users to successively load fuel, and thus have a hopper provided on the oven for fuel loading; during fuel loading, the fuel being load may arch to block the hopper, resulting in obstructed loading.

In the prior art, manual fuel turning is required to split arched fuel. Due to inefficiency of such manual turning, fuel arching still occurs to adversely affect fuel supply to the hearth. Besides, manual turning consumes both time and effort.

SUMMARY OF THE INVENTION

An embodiment of the present application provides a BBQ oven to solve the problem of time- and effort-consuming constant manual turning required in the related art, by which fuel arching may still occur to adversely affect fuel supply to the hearth.

The present invention provides a BBQ oven comprising:
An oven;
A loading container which is provided on the oven. The loading container has a loading inlet on the top and a discharge outlet at the bottom;
A mixing unit which includes a mixing driver positioned on the side wall of the loading container and a mixer connected to the mixing driver.

In some embodiments, the mixer comprises a sleeve, a linking rod and a mixing rod; the sleeve is fixed on the driving shaft of the mixing driver; the linking rod is positioned inside of the sleeve; the mixing rod has one end connected flexibly to the linking rod and the other end extend beyond the side wall of the sleeve.

In some embodiments, the mixing rod has a groove on its side wall; the linking rod fits in the groove.

In some embodiments, the groove is arc-shaped.

In some embodiments, the sleeve comprises a sleeve body and a gland; the gland is arranged on the sleeve body in a removable manner; the sleeve body is concave inwards to form a chute; the linking rod is arranged flexibly in the chute.

In some embodiments, the mixing rod has hardness of above HRC35.

In some embodiments, the present invention still comprises:
A hearth which is arranged in the oven;
A casing which is provided on the oven and communicating to the hearth. The casing has an opening that communicates to the discharge outlet;
A loading mechanism which is positioned in the casing and used for loading of the hearth; An air supply mechanism which is positioned in the casing and used for air supply to the hearth;
A temperature sensor which is arranged on the oven and used for collecting the ambient temperature;
A controller which is connected to the temperature sensor and used for receiving the ambient temperature collected by the temperature sensor; the ambient temperature received is used for control over operation of the loading mechanism and the air supply mechanism.

In some embodiments, the loading mechanism comprises a loading driver, a feeding tube and a spiral transmission shaft; the feeding tube is positioned in the casing; the spiral transmission shaft is positioned in the feeding tube; the loading driver is connected to the spiral transmission shaft for driving;
The feeding tube has a material-receiving port and a feeding port; the material-receiving port communicates to the opening on the casing; the feeding port communicates to the hearth.

In some embodiments, the loading driver has an output shaft c; the cross section of the output shaft c has at least one straight edge d;
The BBQ oven also comprises a coupling part which is arranged on the spiral transmission shaft and used for connecting the spiral transmission shaft and the loading driver.

In some embodiments, the spiral transmission shaft has a limit slot at the inward depression on the circumference of the external wall;
The coupling part includes a bushing and a first connecting piece inserted flexibly in the bushing; the bushing is arranged on the spiral transmission shaft; when the output shaft c connects to the spiral transmission shaft, the first connecting piece runs through the bushing to the limit slot.

In some embodiments, the spiral transmission shaft has a limit collar on the side wall; when the bushing comes in contact with the limit collar, the hole on the side wall of the bushing communicates to the limit slot.

In some embodiments, the coupling part further comprises an adapter plate and a second connecting piece; the adapter plate is connected to the loading driver in a removable manner; the second connecting piece is used for fixing the adapter plate and the bushing onto the casing.

In some embodiments, the oven has a carrier rack inside; on the carrier rack is an oil plate provided; the oven has an oil plate access opening on the side wall.

In some embodiments, the carrier rack comprises a first folded plate and a second folded plate that are connected to each other; the first folded plate is fixed to the side wall of the oven; the second folded plate is positioned in the oven, and extends in the direction far away from the first folded plate to the oil plate access opening.

In some embodiments, the carrier rack also includes a third folded plate which connects the first folded plate and the second folded plate to realize indirect connection between the first folded plate and the second folded plate; the third folded plate forms an included angle with the second folded plate; the third folded plate forms a placement slot with the oven.

In some embodiments, a fire-blocking cover is provided in the hearth; the fire-blocking cover has an opening on the top, and can move along the length of the hearth;
A fire deflector is provided at the top inside the fire-blocking cover; the fire deflector has a first thermally conductive surface and a second thermally conductive surface; the first thermally conductive surface forms a first air deflector a with the hearth; the second thermally conductive surface forms a second air deflector b with the hearth; the fire-blocking cover can be moved to change the area of the first air deflector a and the second air deflector b.

In some embodiments, the fire deflectors comprise a first fire deflector and a second fire deflector; the first fire deflector, the second fire deflector and the fire-blocking cover form a space of which the cross section is shaped roughly as a isosceles triangle; the first fire deflector has the side away from the space form the first thermally conductive surface; the second fire deflector has the side away from the space form the second thermally conductive surface.

In some embodiments, the present invention comprises:
A case which is positioned on the oven and encloses the loading container;
A power source holder which is provided on the inner side wall of the case. The power source holder and the inner wall of the case form a power source containing cavity; the power source containing cavity has an opening;
A press-holding mechanism which is positioned on the side wall of the power source holder. The press-holding mechanism has one press-holding end which can move close to or away from the power source containing cavity.

In some embodiments, the press-holding mechanism includes a clip; the power source holder has one adjustable opening on the side wall; the clip is located inside of the adjustable opening; the clip has one end connect to the power source holder, and the other end act as a press-holding end.

In some embodiments, the power source holder comprises a first side plate and two second side plates; the two second side plates are arranged in a spaced manner; the second side plates connect to the side wall of the case and the first side plate; the first side plate, the second side plates and the case form the power source containing cavity.

Benefits of the technical proposal provided in the present application include:

Embodiments of the present application provide a BBQ oven which requires no manual turning to prevent fuel arching, as the mixing unit consisting of the mixing driver and the mixer connected to the mixing driver can mix and split fuel being arched by turning of the mixer driven by the mixing driver, and thereby reduces the labor work intensity.

BRIEF DESCRIPTION OF THE DRAWINGS

Preferred and alternative examples of the present invention are described in detail below with reference to the following drawings.

To further clarify the technical proposal of the present application, a brief description of the accompanying drawings used in embodiments of the technical proposal is given. Apparently the accompanying drawings described below are non-exclusive embodiments of the present invention, and other accompanying drawings may be derived without creative effort by persons of ordinary skill in the art based on these drawings above.

In the drawings: 1. Oven; 2. Loading container; 3. Loading inlet; 4. Discharge outlet; 5. Mixing unit; 51. Mixing driver; 52. Mixer; 521. Sleeve; 5211 Sleeve body; 5212. Gland; 522. Linking rod; 523. Mixing rod; 6. Groove; 7. Chute; 8. Hearth; 9. Loading mechanism; 91. Loading driver; 92. Feeding tube; 93. Spiral transmission shaft; 10. Air supply mechanism; 20. Casing; 30. Output shaft; 301. Bushing; 302. First connecting piece; 303. Adapter plate; 40. Limit slot; 50. Limit collar; 60. Carrier rack; 601. First folded plate; 602. Second folded plate; 603. Third folded plate; 70. Oil plate; 701. Base plate; 702. Limit plate; 703. Turned edge; 80. Oil plate access opening; 90. Placement slot; 100. Oil guide; 1001. Oil guide inlet; 1002. Oil guide outlet; 200. Case; 300. Power source holder; 3001 First side plate; 3002. Second side plates; 400. Power source containing cavity; 500. Press-holding mechanism; 600. Adjustable opening; 700. Fire-blocking cover; 800. Fire deflectors; 8001. First fire deflector; 8002 Second fire deflector; 900. First thermally conductive surface; 1000. Second thermally conductive surface; a. First air deflector; b. Second air deflector; c. Output shaft; d. Straight edge.

DETAILED DESCRIPTION OF THE PREFERRED EMBODIMENT

To further clarify the objects, technical proposal and advantages of embodiments in accordance with the present application, a clear and complete description of the technical proposal in the embodiments of the present application is given below in combination with the accompanying drawings of the embodiments. Apparently the embodiments described above are demonstrative other than exclusive. All other embodiments derived without creative effort by persons of ordinary skill in the art based on the embodiments of the present application are covered by the present invention defined by the claims.

To solve the problems described above, reference is made to the accompanying drawings 1-12. The present application discloses a BBQ oven which provides a solution to the problem of time- and effort-consuming constant manual turning required in the related art, by which fuel arching may still occur to adversely affect fuel supply to the hearth.

The present application provides a BBQ oven, comprising an oven 1, a loading container 2 and a mixing unit 5. The loading container 2 is provided on the oven 1, having a loading inlet 3 on the top and a discharge outlet 4 at the bottom; the mixing unit 5 includes a mixing driver 51 provided on the side wall of the loading container 2 and a mixer 52 connected to the mixing driver 51.

Figure 1:
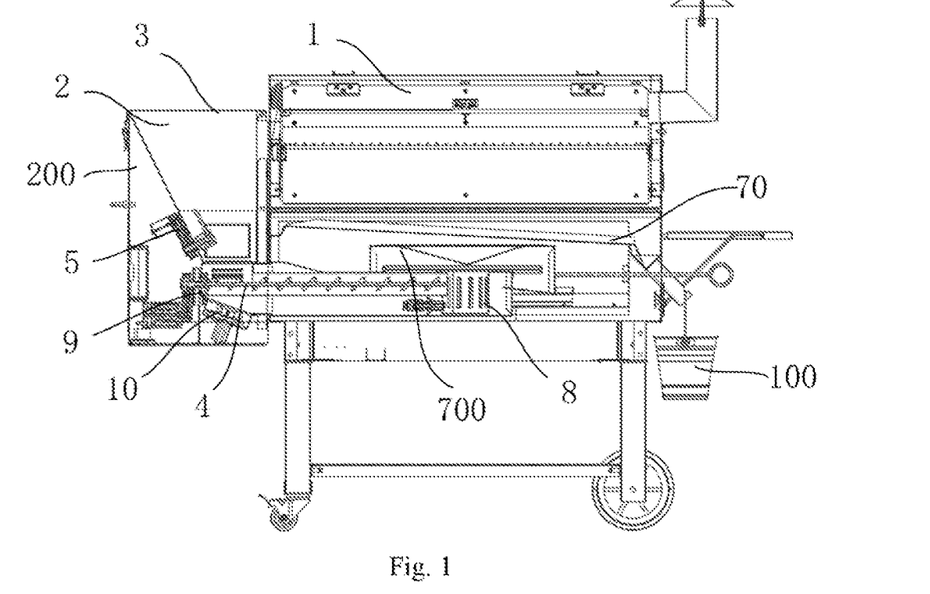
FIG. 1 is an internal structure view of the BBQ oven provided in accordance with an embodiment of the present application.

In the present application, as shown in FIG. 1, the cross section of the loading container 2 is right trapezoid-shaped. For convenient loading, the loading inlet 3 has a wide opening, and the discharge outlet 4 has a narrow opening; the mixing driver 51 and the mixer 52 are both provided on the inclined side wall of the loading container 2; the rotation shaft of the mixing driver rotates in parallel to the inclined side wall; when "arching" (namely material accumulation) occurs, the mixing driver 51 will drive the mixer 52 to move the material, so as to realize arching interruption.

Further, the mixer 52 comprises a sleeve 521, a linking rod 522 and a mixing rod 523; the sleeve 521 is fixed on the driving shaft of the mixing driver 51; the linking rod 522 is provided inside of the sleeve 521; the mixing rod 523 has one end connected flexibly to the linking rod 522 and the other end extend beyond the side wall of the sleeve 521.

In the present application, the mixing driver 51 is preferably a mixing motor available on the market; when the mixing motor drives the drive shaft, the sleeve 521 will be driven along to realize rotation of the mixing rod 523; as the mixing rod 523 is connected to the linking rod 522, it can be understood that the mixing rod can move in two perpendicular directions; compared with the conventional movement in one direction, the mixing rod 523 in the present application has a wider range of movement to realize better "arching interruption".

Based on the embodiment above, to realize rotation, the mixing rod 523 has a groove 6 on the side wall; the linking rod 522 fits the groove 6.

Figure 4:
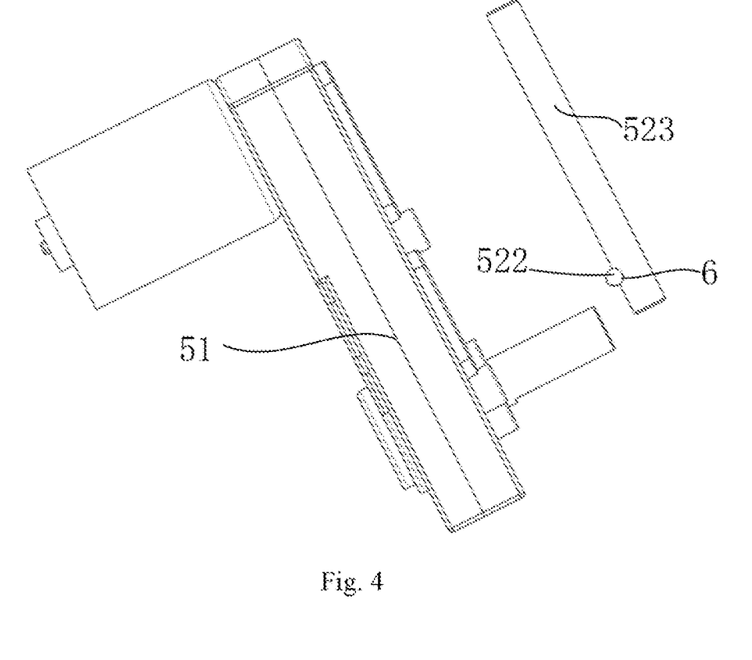
FIG. 4 is the side view of the connected linking rod and mixing rod in accordance with an embodiment of the present application.
Figure 5:
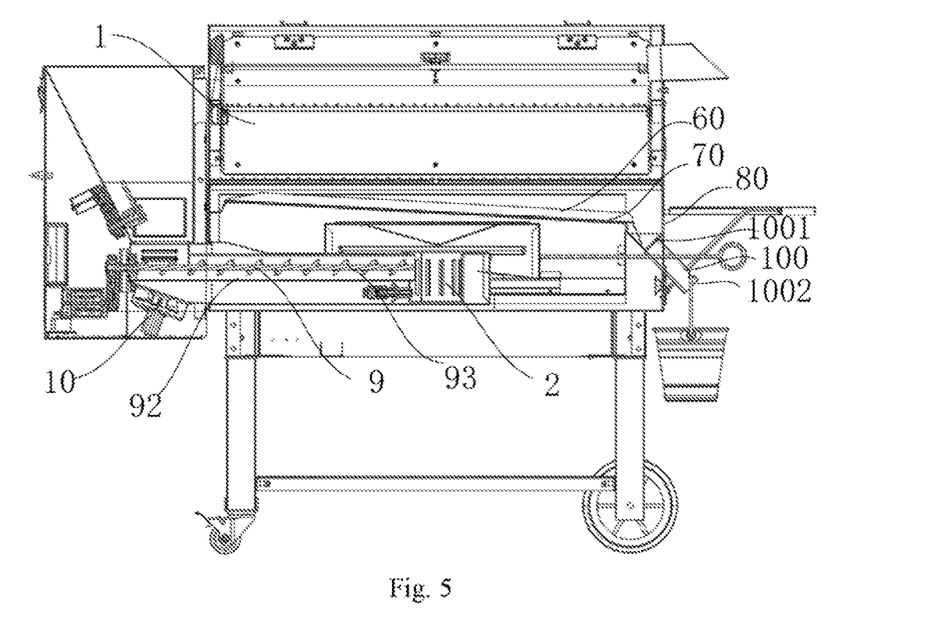
FIG. 5 is an internal structure view of the BBQ oven provided in accordance with an embodiment of the present application.

As shown in FIG. 4, the mixing rod 523 can rotate in the groove 6; for smooth and stable rotation of the linking rod 522, the groove 6 is arc-shaped.

In the present application, for convenient arrangement and detachment, the sleeve 521 comprises a sleeve body 5211 and a gland 5212; the gland 5212 is provided on the sleeve body 5211 in a removable manner, specifically by use of screw or bolt connection; the sleeve body 5211 sinks inwards to form a chute 7; the linking rod 522 is arranged flexibly in the chute 7.

Figure 3:
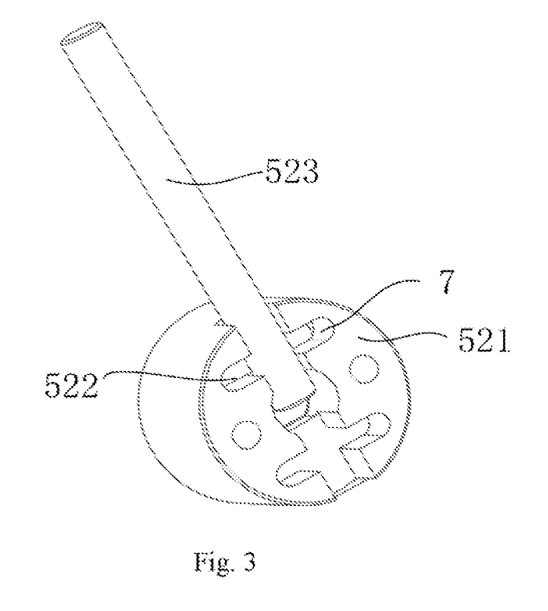
FIG. 3 is an internal structure view of the mixing driver provided in accordance with an embodiment of the present application.

As shown in FIG. 3, if the linking rod 522 is fixed, then the rotating range of the mixing rod 523 is also fixed; to enlarge the rotating range of the mixing rod 523, the linking rod 522 is flexibly provided in the chute 7. As the chute 7 has both sides arranged close to the linking rod, its moving range is limited. Therefore, in the present application, the linking rod 522 mainly moves from the top opening to the bottom of the chute, or from the bottom to the top opening of the chute; as the linking rod 522 is movable, the rotating range of the mixing rod 523 is enlarged, which may help split "arched" material.

The linking rod 522 is movable, and thus can move when the mixing driver 51 rotates. It should be understood that when the linking rod 522 is located at the chute bottom and the mixing rod 523 fits the gland 5212, the linking rod 522 should have a part remain in the groove 6 to prevent the mixing rod 523 from fall from the sleeve body 5211.

Further, considering frequent collision between the mixing rod 523 frequently collides and the linking rod 522, the mixing rod 523 should have hardness of above HRC 35.

Further, the BBQ oven according to the application still comprises a hearth 8, a casing 20, a loading mechanism 9, an air supply mechanism 10, a temperature sensor (not shown in the figure) and a controller (not shown in the figure).

The oven 1 has a hearth 8 inside; the loading mechanism 9 is provided in the casing 20 and used for loading the hearth 8; the air supply mechanism 10 is provided in the casing 20, and used for supplying air to the hearth 8; the temperature sensor is provided on the oven 1, and used for collecting the ambient temperature; the controller connected with the temperature sensor is used for controlling operations of the loading mechanism 9 and the air supply mechanism 10 based on the ambient temperature received from the temperature sensor.

In the present application, the loading mechanism 9 adopts a spiral transmission shaft and is driven by a motor, with a controller connected to the motor signal to control the rotating speed of the motor; the air supply mechanism 10 adopts a fan currently available on the market, with a controller connected to the motor signal to control the rotating speed of the fan; a controller connecting to the motor and a controller connecting to a fan described above are present in prior art, and thus no further explanation will be given.

During specific implementation, the temperature sensor collects the ambient temperature. For example, when low ambient temperature data collected in winter is transmitted to the controllers, the controllers will control the loading mechanism 9 to load more fuel and control the air supply mechanism 10 to supply more air; when high ambient temperature data collected in summer is transmitted to the controllers, the controllers will control the loading mechanism 9 to reduce loading and control the air supply mechanism 10 to reduce air supply.

Figure 6:
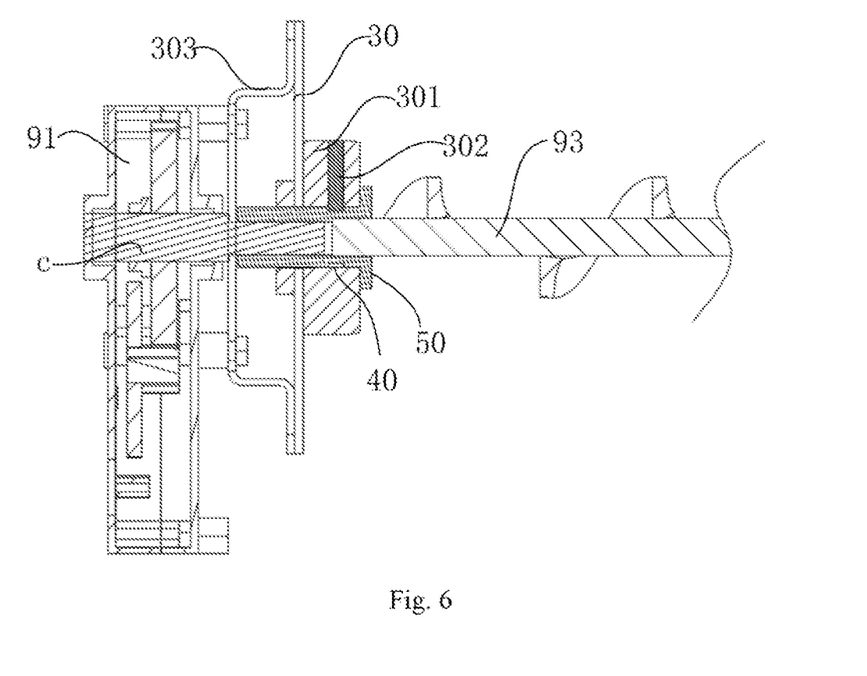
FIG. 6 is the sectional view of the loading unit provided in accordance with an embodiment of the present application.

Based on the embodiment described above, the loading mechanism 9 comprises a loading driver 91, a feeding tube 92 and a spiral transmission shaft 93; the feeding tube 92 is provided in the casing 20; the spiral transmission shaft 93 is provided in the feeding tube 92; the loading driver 91 is connected to the spiral transmission shaft 93 for driving;

The feeding tube 92 has a material-receiving port and a feeding port; the material-receiving port communicates to the opening on the casing 20; the feeding port communicates to the hearth 8.

The loading driver 91 adopts a motor driving the spiral transmission shaft 93 to rotate, in realization of material transport.

Figure 7:
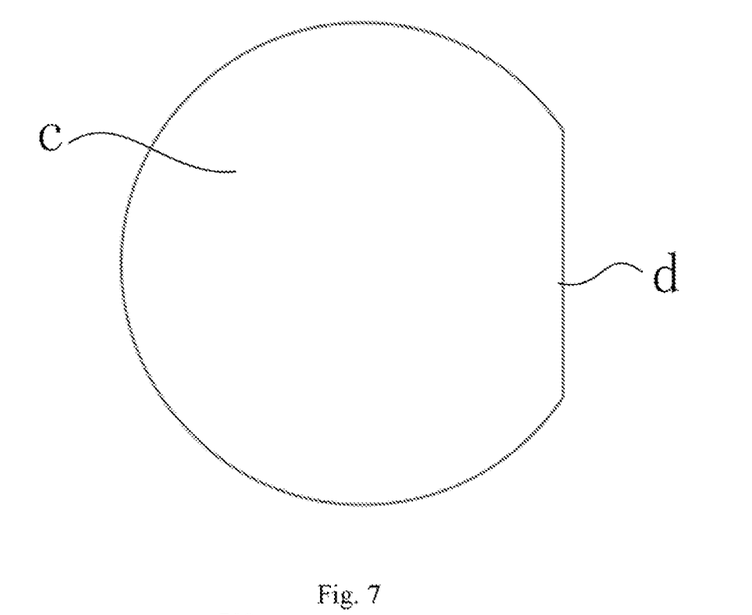
FIG. 7 is the sectional view of the output shaft provided in accordance with an embodiment of the present application.

Further, the loading driver has an output shaft c; the cross section of the output shaft c has at least one straight edge d;

The BBQ oven also comprises a coupling part 30 which is provided on the spiral transmission shaft 93 and used for connecting the spiral transmission shaft 93 and the loading driver 91.

In conventional solutions, the feeding screw head and the feeding motor output shaft are connected via drive pins or screws; pins and screws have limited load-bearing capacity, and are prone to shear fracture due to fatigue. In the present application, the cross section of the output shaft c has a straight edge d which can largely increase the torque compared with the conventional use of pin or screw transmission. It is understood that two or three straight edges d may well be provided to increase the torque; on the other hand, the coupling part 5 in the present application may connect the spiral transmission shaft 4 and the driver 1 to prevent separation of the spiral transmission shaft 4 from the output shaft 2.

Further, the spiral transmission shaft 93 has a limit slot 40 at the inward depression on the circumference of the external wall;

The coupling part 30 includes a bushing 301 and a first connecting piece 302 inserted flexibly in the bushing 301; the bushing 301 is arranged on the spiral transmission shaft 93; when the output shaft c connects to the spiral transmission shaft 93, the first connecting piece 302 runs through the bushing 301 to the limit slot 40; the first connecting piece 302 is a rod piece, and a pin or other connecting piece alike can be used.

The bushing 301 is provided on the spiral transmission shaft 93; the bushing 301 has a hole, through which the first connecting piece 302 can run through and extend to the limit slot 40; the limit slot 40 is a circular slot, and therefore can limit the axial movement of the spiral transmission shaft 93 when the bushing 301 connects to the loading driver 91; as the limit slot 40 is circular, rotation of the output shaft c can drive rotation of the spiral transmission shaft 93; in the present application, the first connecting piece 302 is preferably a rod piece; this design provides convenience for replacement and maintenance of the spiral transmission shaft 93.

Based on the embodiment described above, for accurate insertion of the first connecting piece 302 into the limit slot 40 when the bushing 301 is run onto the spiral transmission shaft 93, the spiral transmission shaft 93 has a limit collar 50 on the side wall; when the bushing 301 presses against the limit collar 50, the opening on the side wall of the bushing 301 communicates to the limit slot 40.

In the present application, the limit collar 50 is circular. It can be certainly understood that the limit collar 50 can be block-shaped or of other irregular shape, provided the protruding spiral transmission shaft 93 can be set.

Further, the coupling part 30 also comprises an adapter plate 303 and a second connecting piece; the adapter plate 303 is connected to the loading driver 91 in a removable manner; the second connecting piece is used for fixing the adapter plate 303 and the bushing 301 onto the casing 20.

For easy fixation of the loading driver 91 and the bushing 301, the coupling part 30 described in the present application still comprises an adapter plate 303 and a second connecting piece; the adapter plate 303 is connected to the driver 1 in a removable manner; the second connecting piece is used for fixing the adapter plate 303 and the bushing 301 to the feeding tube 92.

The second connecting piece is preferably a screw, a bolt or other removable connecting piece.

Figure 8:
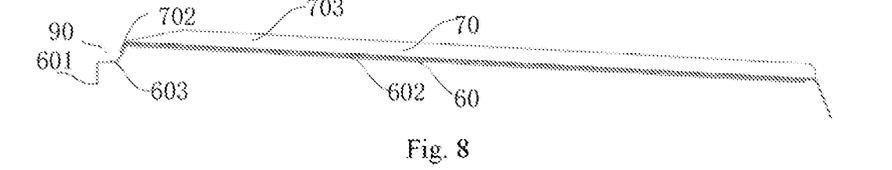
FIG. 8 is a structural view of the carrier rack provided in accordance with an embodiment of the present application.

Further, in the present application, the oven 1 has a carrier rack 60 inside; on the carrier rack 60 is an oil plate 70 provided; the oven 1 has an oil plate access opening 80 on the side wall.

Figure 12:
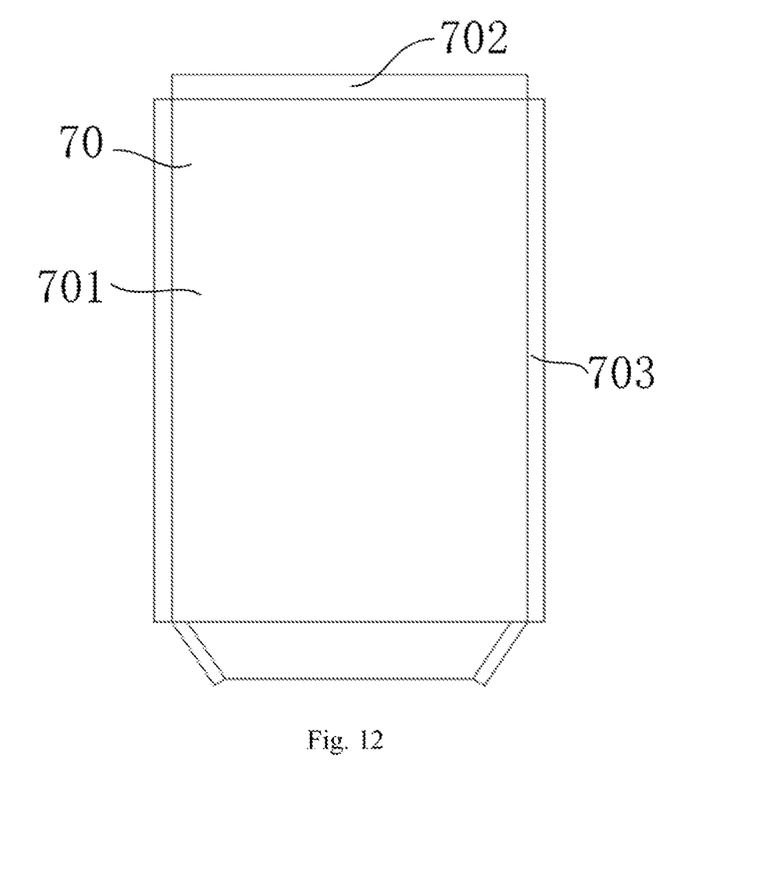
FIG. 12 is a structural view of the oil plate provided in accordance with an embodiment of the present application.

In the present application, the oil plate 70 collects oil falling from the grates; as the oil plate 70 is erected on the carrier rack 60, and the oven 1 has an oil plate access opening on the side wall, the user can easily take out the oil plate 70 via the oil plate access opening 80 for cleaning, so as to prevent long-time accumulation of greasy dirt.

Specifically, the carrier rack 60 comprises a first folded plate 601 and a second folded plate 602 that are connected to each other; the first folded plate 601 is fixed to the side wall of the oven 1; the second folded plate 602 is provided in the oven 1, and extends in the direction far away from the first folded plate 601 to the oil plate access opening 80.

Specifically, the carrier rack 60 also includes a third folded plate 603; the third folded plate connects the first folded plate 601 and the second folded plate 602 to realize indirect connection between the first folded plate 601 and the second folded plate 602; an included angle is formed between the third folded plate 603 and the second folded plate 602; a placement slot 90 is formed between the third folded plate 603 forms and the oven 1.

For position limit, the oil plate 70 comprises a base plate 701 and a limit plate 702 that are mutually connected; the limit plate 702 is provided at the end of the base plate 701 far away from the oil plate access opening, so that when the base plate 701 is placed on the third folded plate 603, the limit plate 702 is located in the placement slot 90 and presses against the third folded plate 603.

Figure 2:
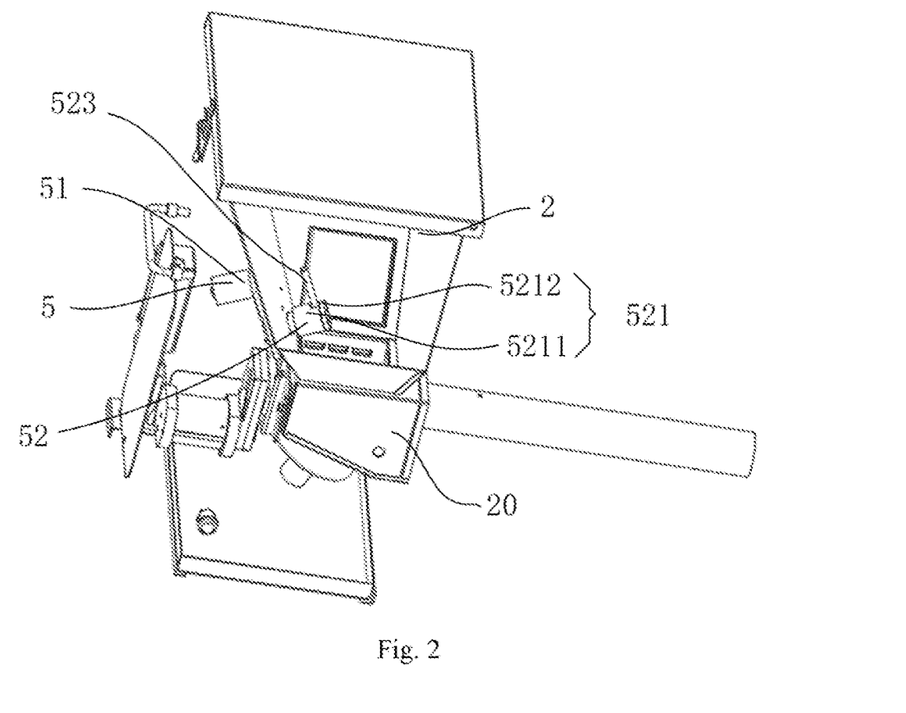
FIG. 2 is an internal structure view of the loading container provided in accordance with an embodiment of the present application.

As shown in FIG. 2, when the limit plate 702 contacts the third folded plate 603, the third folded plate 603 will press against the limit plate 702 to prevent fall of the oil plate 70 from the carrier rack 60.

In the present application, for easy drip of oil from the oil plate 70, the whole base plate 701 and the second folded plate 602 are arranged inclined, and the second folded plate 602 has the end close to the third folded plate 603 higher than the other end; therefore, in the present application, the placement slot (90) formed between the third folded plate 603 and the oven 1 can contain the limit plate 702 when the oil plate 70 is set in place.

To prevent oil splash, the base plate 701 has both sides extend upwards with turned edges 703 along the length of the base plate 701; the length of the turned edges 703 can be set as appropriate.

For guiding oil out of the oven 1, an oil guide 100 is provided on the oven 1; the oil guide 100 has an oil guide inlet 1001 at one end, and an oil guide outlet 1002 at the other end; the oil guide 100 is arranged inclined; the oil guide inlet 1001 is located below the oil plate 70, and is used for collecting oil guided out by the oil plate 70; the oil guide inlet 1001 is higher than the oil guide outlet 1002.

Figure 9:
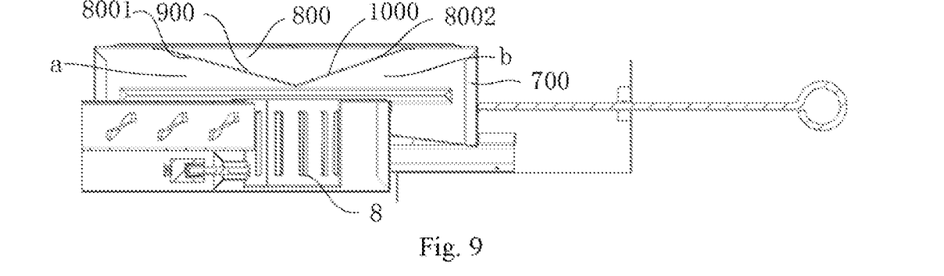
FIG. 9 is a structural view of the fire-blocking cover provided in accordance with an embodiment of the present application.

In the present application, the BBQ oven still comprises a fire-blocking cover 700 and fire deflectors 800; the fire-blocking cover 700 provided on the hearth 8 has an opening on the top and can move along its length relative to the hearth 8; the fire deflectors 800 provided on the top inside the fire-blocking cover 700 have the first thermally conductive surface 900 and the second thermally conductive surface 1000; the first thermally conductive surface 900 forms a first air deflector a with the hearth 8; the second thermally conductive surface 1000 forms a second air deflector b with the hearth 8; the fire-blocking cover 700 can move to adjust the area of the first air deflector a and the second air deflector b.

During specific implementation, as shown in FIG. 9, heat produced in the hearth 8 dissipates through the second air deflector b, the first air deflector a and the opening on the top of the fire-blocking cover 700; when it is only required to heat the right side of the grates, it is simply needed to move the fire-blocking cover 700 leftwards; at this time, heat will mainly dissipate along the second thermally conductive surface 1000, and relatively less heat will dissipate via the first air deflector a due to the reduced area; therefore, movement of the fire-blocking cover 700 can change the area of the first air deflector a and the second air deflector b to meet the searing needs at different parts, so as to prevent waste of resources.

Further, in the present application, the fire deflectors 800 comprise a first fire deflector 8001 and a second fire deflector 8002; the first fire deflector 8001, the second fire deflector 8002 and the fire-blocking cover 700 form a space of which the cross section is shaped roughly as a isosceles triangle; the first fire deflector 8001 has the side away from the space form the first thermally conductive surface 900; the second fire deflector 8002 has the side away from the space form the second thermally conductive surface 1000.

Figure 10:
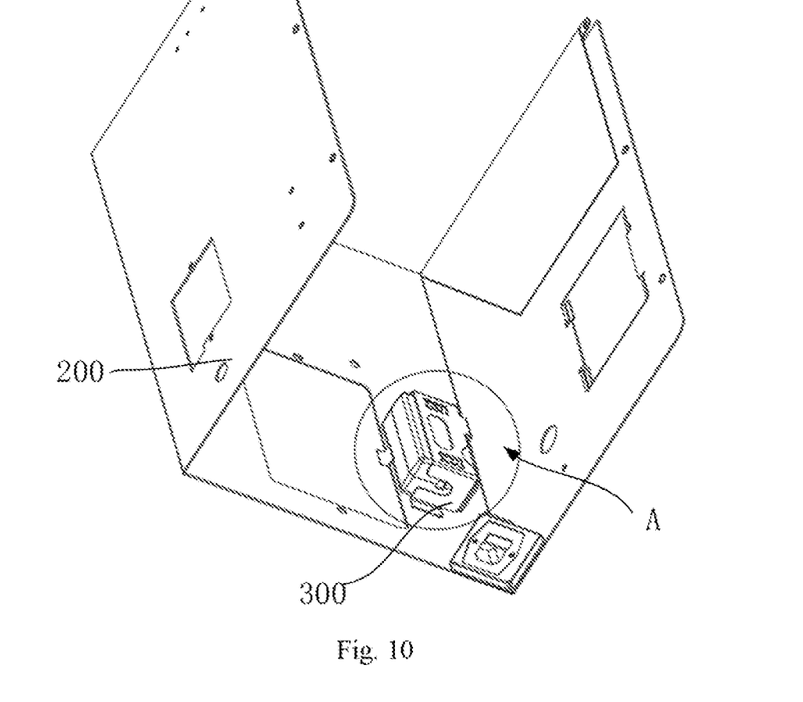
FIG. 10 is a structural view of the power source holder provided in accordance with an embodiment of the present application.

Further, the BBQ over according to the present application still comprises a case 200, a power source holder 300 and a press-holding mechanism 500; the case 200 is arranged on the oven 1 and encloses the loading container 2; the power source holder 300 is arranged on the inner side wall of the case 200; inner walls of the power source holder 300 and the case 200 enclose to form a power source containing cavity 400; the power source containing cavity has an opening; the press-holding mechanism 500 is provided on the side wall of the power source holder 300; the press-holding mechanism 500 has a press-holding end which can move close to or away from the power source containing cavity 400.

Figure 11:
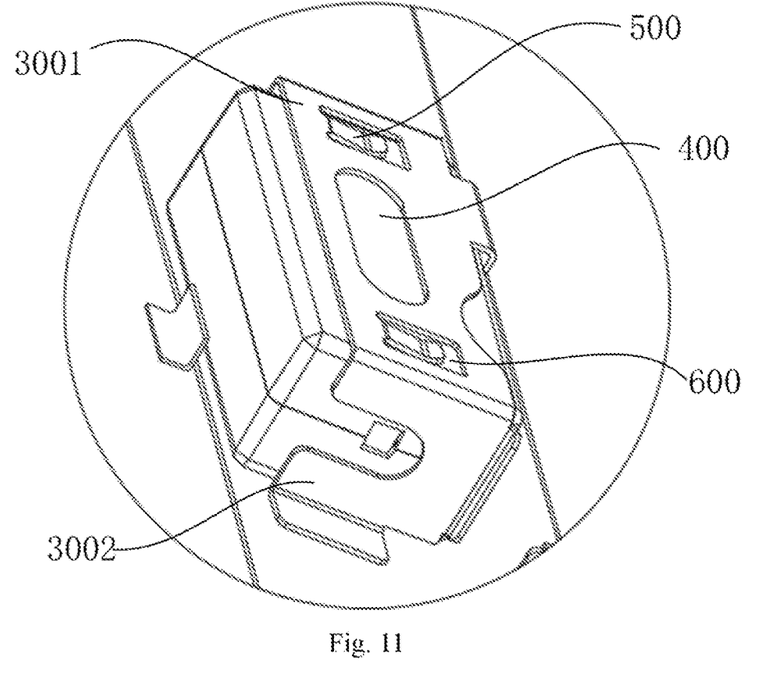
FIG. 11 is an amplified view of the structural point A in FIG. 10.

As shown in FIG. 10 and FIG. 11, in the present application, the power source holder 300 is provided on the inner side wall of the case 200; the inner side walls of the power source holder 300 and the case 200 enclose to form the power source containing cavity 400; therefore, the power source can be placed in the power source containing cavity 400 other than outside of the oven, thereby having reduced the risk of damage.

On the other hand, as the power source holder 300 has a press-holding mechanism 500 provided on the side wall, and the press-holding mechanism 500 has a press-holding end that can move close to or away from the power source containing cavity 400, when the power source is placed in the power source containing cavity 300, the press-holding end moves close to the power source containing cavity 400 to hold the power source; when the press-holding end moves away, the power source is removed from the power source containing cavity 400.

Based on the embodiment described above, the press-holding mechanism 500 includes a clip; the power source holder 300 has one adjustable opening 600 on the side wall; the clip is located inside of the adjustable opening 600; the clip has one end connect to the power source holder 300, and the other end act as a press-holding end.

When the chip is free, the press-holding end is located in the power source containing cavity 400. As shown in FIG. 11, the press-holding end of the chip is far away from the opening end of the power source containing cavity 400, and turning of the far-away end and the end connecting to the power source holder 300 makes an easy access for the power source; when the power source is placed in the power source containing cavity 400, the press-holding end of the chip will press the power source to prevent the power source falling.

As shown in FIG. 11, the power source holder 300 comprises a first side plate 3001 and two second side plates 3002; the two second side plates 3002 are arranged in a spaced manner; the second side plates 3002 connect to the side wall of the case 200 and the first side plate 3001; the first side plate 3001, the second side plates 3002 and the case 200 form the power source containing cavity 400.

Further, to make maintenance of the BBQ oven and replacement of the power source easy, the case 200 has an access panel on the side wall; the access panel is provided on the case 200 in a removable manner by using screws or otherwise according to prior art.

Surely to further protect the power source and prevent the power source falling, the access panel is provided with a press-holding plate on one side in the case 200; when the access panel is positioned on the case 200, the press-holding plate will press against the power source and prevent the power source from falling; the press-holding plate is not limited in shape, and can be provided based on the actual conditions.

In the description of the application, it should be noted that words indicating directions or relative positions, such as "up" and "down", are only used for convenience of description and simplified description of the application, other than for indicating or implying the specific position of a device or element, or the specific way of constructing and operating such device or element, and shall by no means be taken to limit the application. Unless otherwise expressly provided and defined, terms such as "arrangement", "linking" and "connection" should be broadly interpreted. For example, a connection can be a fixed connection, a detachable connection or an integrated connection; a mechanical connection or an electrical connection; a direct connection, an indirect connection via an intermediate medium; or internal communication between two elements. It is required that persons of ordinary skill in the art should understand the specific meanings of the terms above in the present application based on specific circumstances.

It should be noted that, in the present application, words indicating relations such as "first" and "second" are simply used for distinguishing one entity or operation from another entity or operation, without necessarily requiring or implying any actual relationship or sequence between these entities or operations. Besides, words like "include", "comprise" or any other variants of the foregoing should be non-exclusive. Namely, any process, method, item or equipment comprising a series of elements comprises not only such elements, but also other elements that are not expressly listed or inherent elements of such process, method, item or equipment. Unless otherwise limited, an element defined by the statement "comprising a/an . . . " does not preclude inclusion of other similar elements in the process, method, item or equipment of the element.

All the specific ways of implementing the present application described above are intended to make those skilled in the art understand or realize the present application. These embodiments may have various modifications and alterations apparent to those skilled in the art, and the general principle defined herein may be realized in other embodiments without departing from spirit and scope of the application. For this purpose, the present application is not limited to the embodiments provided herein, and should include the widest scope of consistency with the principle and novel features of the present invention.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A BBQ oven, comprising:
 an oven;
 a loading container which is arranged on the oven, wherein the loading container has a loading inlet on the top and a discharge outlet at the bottom; and
 a mixing unit comprising:
  a mixing driver having a driving shaft and positioned on a wall of the loading container; and
  a mixer connected to the mixing driver, wherein the mixer comprises:
   a sleeve fixed on the driving shaft of the mixing driver;

a mixing rod having a groove and one end extending beyond a side wall of the sleeve; and
a linking rod arranged inside of the sleeve and configured to fit in the groove of the mixing rod.

2. The BBQ oven of claim 1, wherein the groove is arc shaped.

3. The BBQ oven of claim 1, wherein:
the sleeve comprises a sleeve body and a gland;
the gland is positioned on the sleeve body in a removable manner;
the sleeve body is concave inwards to form a chute, and the linking rod is arranged flexibly in the chute.

4. The BBQ oven of claim 1, wherein: the mixing rod has hardness of above HRC35.

5. A BBQ oven, comprising:
an oven having a hearth;
a casing provided on the oven and communicating with the hearth, the casing having an opening that communicates with the discharge outlet;
a loading mechanism positioned in the casing and used for loading of the hearth, the loading mechanism comprising:
a feeding tube positioned in the casing and having a spiral transmission shaft with a limit slot at an inward depression on the circumference of an external wall, wherein the feeding tube has a material-receiving port and a feeding port, wherein the material-receiving port communicates to the opening on the casing and the feeding port communicates to the hearth; and
a loading driver connected to the spiral transmission shaft for driving, the loading driver comprising:
an output shaft with a cross section of at least one straight edge; and
a coupling part arranged on the spiral transmission shaft and used for connecting the spiral transmission shaft and the loading driver, the coupling part including a bushing and a first connecting piece inserted flexibly in the bushing, wherein the bushing is arranged on the spiral transmission shaft and the first connecting piece runs through the bushing to the limit slot when the output shaft connects to the spiral transmission shaft; and
an air supply mechanism that is positioned in the casing and used for air supply to the hearth;
a temperature sensor which is arranged on the oven and used for collecting the ambient temperature;
a controller which is connected to the temperature sensor and used for receiving ambient temperature collected by the temperature sensor, so as to control operation of the loading mechanism and the air supply mechanism;
a loading container that is arranged on the oven, wherein the loading container has a loading inlet on the top and a discharge outlet at the bottom; and
a mixing unit that includes a mixing driver positioned on a wall of the loading container and a mixer connected to the mixing driver.

6. The BBQ oven of claim 5, wherein the spiral transmission shaft has a limit collar on the wall, and a hole on a wall of the bushing communicates to the limit slot when the bushing comes in contact with the limit collar.

7. The BBQ oven of claim 5, wherein: the coupling part further comprises an adapter plate and a second connecting piece, wherein the adapter plate is connected to the loading driver in a removable manner and the second connecting piece is used for fixing the adapter plate and the bushing onto the casing.

8. The BBQ oven of claim 1, wherein the oven has a carrier rack configured as an oil plate and an oil plate access opening.

9. The BBQ oven of claim 8, wherein the carrier rack comprises a first folded plate and a second folded plate that are connected to each other, wherein the first folded plate is fixed to the side wall of the oven and the second folded plate is positioned in the oven; and extends in the direction far away from the first folded plate towards the oil plate access opening.

10. A BBQ oven, comprising:
an oven;
a carrier rack configured as an oil plate and having an oil plate access opening on a side wall, wherein the carrier rack comprises:
a first folded plate fixed to a side wall of the oven;
a second folded plate positioned in the oven and extending in a direction away from the first folded plate towards the oil plate access opening; and
a third folded plate connecting the first folded plate and the second folded plate to realize indirect connection between the first folded plate and the second folded plate, wherein an angle is formed between the second and third folded plates and a placement slot is formed between the third folded plate and the oven; and
a loading container which is arranged on the oven, wherein the loading container has a loading inlet on the top and a discharge outlet at the bottom; and
a mixing unit which includes a mixing driver positioned on a wall of the loading container and a mixer connected to the mixing driver.

11. The BBQ oven of claim 5, further comprising:
a fire-blocking cover having an opening on the top and configured to move along the length of the hearth; and
a first fire deflectors at the top inside the fire-blocking cover, the first fire deflectors having a first thermally conductive surface that forms a first air deflector with the hearth, and a second thermally conductive surface that forms a second air deflector with the hearth, wherein the fire-blocking cover is configured moveable to change the area of the first air deflector and the second air deflector.

12. The BBQ oven of claim 11, further comprising a second fire deflectors, wherein:
the first fire deflector, the second fire deflector and the fire-blocking cover form a space of which the cross section is shaped roughly as an isosceles triangle;
the first fire deflector has a side away from the space which forms the first thermally conductive surface; and
the second fire deflector has a side away from the space that forms the second thermally conductive surface.

13. A BBQ oven, comprising:
an oven;
a loading container which is arranged on the oven, wherein the loading container has a loading inlet on the top and a discharge outlet at the bottom;
a case provided on the oven and enclosing the loading container;
a power source holder having an adjustable opening arranged on a wall of the case, wherein the power source holder and the wall form a power source containing cavity having an opening;
a press-holding mechanism arranged on the wall of the power source holder, wherein the press-holding mechanism has one press-holding end that can move close to or away from the power source containing cavity, the press-holding mechanism having a clip positioned inside of the adjustable opening, the clip having one end connected to the power source holder and the other end acting as a press-holding end; and a mixing unit which includes a mixing driver positioned on a wall of the loading container and a mixer connected to the mixing driver.

14. The BBQ oven of claim 13, wherein:

the power source holder comprises a first side plate and two second side plates;

the second side plates are arranged in a spaced manner, wherein the second side plates connect to a side wall of the case and the first side plate; and the first side plate, the second side plates and the case form the power source containing cavity.

\* \* \* \* \*

UNITED STATES PATENT AND TRADEMARK OFFICE
CERTIFICATE OF CORRECTION

| | |
|---|---|
| PATENT NO. | : 12,287,096 B2 |
| APPLICATION NO. | : 17/765437 |
| DATED | : April 29, 2025 |
| INVENTOR(S) | : David W. Baker et al. |

Page 1 of 1

It is certified that error appears in the above-identified patent and that said Letters Patent is hereby corrected as shown below:

In the Claims

In Column 11, Line 43, remove "and".
In Column 11, Line 62, remove ":".
In Column 12, Line 8, remove ";".
In Column 12, Line 26, remove "and".
In Column 12, Line 36, "deflectors" should be --deflector--.
In Column 12, Line 37, "deflectors" should be --deflector--.
In Column 12, Line 45, "deflectors" should be --deflector--.

Signed and Sealed this
Twenty-fourth Day of June, 2025

Coke Morgan Stewart
*Acting Director of the United States Patent and Trademark Office*